3,085,063
SECONDARY RECOVERY WATERFLOODING TECHNIQUE
Albin F. Turbak, New Providence, N.J., assignor to Jersey Production Research Company, a corporation of Delaware
No Drawing. Filed Dec. 30, 1959, Ser. No. 862,780
6 Claims. (Cl. 252—8.55)

The present invention is broadly concerned with a secondary recovery process for the more effective and efficient recovery of oil from subterranean reservoirs. The invention is particularly directed to a secondary recovery operation wherein a fluid such as water is employed as a driving medium. The invention is especially concerned with an improved type of viscous waterflooding process in which fingering and oil reservoir bypassing on the part of the driving fluid are substantially reduced by the utilization of a particular class of water thickening agents wherein aldehyde solutions are used to reduce viscosity loss during the viscous waterflooding operation. Particularly desirable materials for preventing viscosity loss are formaldehyde solutions.

In the recovery of oil from subterranean reservoirs, there have been substantial advances in primary recovery techniques so as to substantially increase the recovery of oil. However, an appreciable quantity of the oil remains in the reservoir after termination of the primary recovery methods. In general, it is estimated that only about 10 to 30% of the oil can be economically recovered by primary recovery techniques. A greater amount may be recovered by other secondary techniques, such as repressuring treatments following the primary method.

Thus, there exists a great interest in secondary recovery methods. Secondary recovery is the recovery of additional quantities of oil from a reservoir after it is no longer economical to recover oil by primary recovery methods. For example, a secondary operation may be conducted by drilling one or more injection wells into a permeable oil bearing formation within suitable proximity to a producing well or wells which are drilled into this same permeable oil bearing formation. Injection of liquids or gases through the injection well is generally effective in increasing the oil production from the producing well or wells. This technique of secondary recovery enables the recovery of substantially more oil than can be produced by primary recovery methods.

As pointed out, the use of a number of secondary recovery procedures for removing oil from subterranean oil reservoirs are well known in the petroleum industry. It is the function of such procedures to make possible the recovery of oil from reservoirs after primary production methods are uneconomical. In general, all secondary recovery procedures employ a driving medium such as a liquid or gas for displacing additional oil from a reservoir. The displacing medium, usually a fluid, is injected in a reservoir as by means of one or more of the original wells or by means of entirely new wells; and the oil in the reservoir is displaced toward and withdrawn from other remaining wells.

Due partially to its ready availability in many regions, water has been extensively employed as a driving medium in secondary oil recovery programs.

While conventional waterflooding is effective in obtaining additional oil from subterranean oil reservoirs, it has a number of shortcomings which detract seriously from its value. Foremost among these shortcomings is a tendency of flood water to "finger" through a reservoir and to bypass substantial portions of the reservoir. In other words, a water drive has a less than perfect "sweep efficiency" in that it does not contact all portions of the reservoir. Furthermore, it does not normally displace as much oil in the portions of the reservoir which it contacts as it theoretically is capable of doing.

The fingering tendency of a waterflood is usually explained by the fact that oil reservoirs possess regions and strata that have different permeabilities. The water flows more rapidly through those regions and strata having a greater relative permeability to water than in other portions of the reservoir. Waterflooding often completely misses substantial portions of the reservoir. The net result is an inefficient oil displacement action on the part of the water.

At this point, it should be noted that crude oils vary greatly in viscosity—some being as low as 1 or 2 cps. and some ranging up to 1000 cps. or even more. It has been established that waterflooding performs less satisfactorily with viscous crude oils than with relatively non-viscous oils. In other words, the fingering and bypassing tendencies of the water drive are more or less directly related to the ratio of the viscosity of the reservoir oil to the viscosity of the aqueous driving medium.

Also of interest at his point is a mathematical relationship that has been developed in recent years to help explain the behavior of fluids flowing through porous media such as oil reservoirs. When this equation is applied to a flooding operation or the like within an oil reservoir, it reads as follows:

$$\frac{M_o}{M_e} = \frac{\mu e}{\mu o}, \frac{K_o}{K_e}$$

where:
$M_o$ is the mobility of the oil to the reservoir in question
$M_e$ is the mobility of the flooding medium to the reservoir in question
$\mu o$ is the viscosity of the driven oil
$\mu e$ is the viscosity of the flooding medium
$K_e$ is the relative permeability of the reservoir toward the flooding medium in the presence of residual oil
$K_o$ is the relative permeability of the reservoir toward the oil in the presence of connate water.

This equation is perhaps best explained by stating that when the mobility ratio of oil to the driving fluid within the reservoir is equal to one, the oil and driving fluid move through the reservoir with equal ease. Substantially equilibrium proportions of driving fluid and oil remain within the reservoir as soon as the driving fluid has passed therethrough. Expressed otherwise, the mobility ratio term affords a measure of the volume of driving fluid and the amount of time that is required to reduce the oil content of the reservoir to an ultimate equilibrium value. For example, a given volume of driving fluid operated at a mobility ratio of one or greater will displace a markedly greater volume of oil from a reservoir than will an equal volume of driving fluid operating at a mobility ratio of less than one.

Several procedures have been suggested to date for improving the mechanics of waterflooding procedures particularly with the view to reducing the degree of fingering and bypassing. One suggestion has been to increase the viscosity of the water drive relative to the oil by incorporating water soluble viscous agents within the water. Materials that have been suggested for this purpose include a wide variety of naturally occurring gums, sugars and polymers. While these materials are effective to an extent in increasing the viscosity of flood water, they are also characterized by serious disadvantages. For example, some of the materials have a tendency to plug formations; some are relatively unstable; and some have relatively little thickening effect. Additionally, many of these materials are quite expensive and their use is not feasible from the standpoint of economics.

Accordingly, it is an object of this invention to provide an improved type of displacement process in which a marked increase in the viscosity of the driving fluid may be readily attained using synthetic polymers. It is also an object of the invention to provide a viscous "waterflooding" process in which the increased viscosity of the flood water is attained inexpensively and synthetically. It is still a further object of the invention to use a driving fluid whose viscosity is stable.

In accordance with the specific adaptation of the present invention, an improved class of water thickening agents is utilized wherein aldehyde solutions are used in order to reduce viscosity loss during the viscous waterflooding operation.

The preferred water thickening agents are selected from the class of compounds comprising sulfonated polymers. Particularly desirable polymers are polyvinyl aromatic sulfonates as, for example, polyvinyl toluene sulfonates.

The water thickening agents may comprise sulfonated polymers as, for example, polyvinyl toluene sulfonates, polystyrene sulfonates, or substituted polystyrene sulfonates.

The agents have the following structural formula:

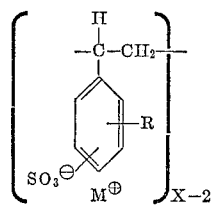

where: R represents H, $CH_3$ or a group for which the Hammett function is known or readily determinable. (See Physical Organic Chemistry by J. Hine, published by Wiley and Co., New York.) X represents the degree of polymerization and has values such that the molecular weight of the resulting polymer is greater than 100,000. $M^{\oplus}$ represents a cationic salt component and may be $Na^{\oplus}K^{\oplus}$, $Li^{\oplus}$, $NH_4^{\oplus}$, $CH_3NH_3^{\oplus}$, $C_2H_5-NH_3^{\oplus}$, $C_3H_7NH_3^{\oplus}$, $C_4H_9NH_3^{\oplus}$, $C_5H_{11}NH_3^{\oplus}$,

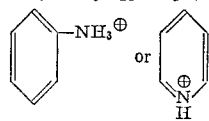

or other amine.

The relative substituent position of R to $-SO_3^{\ominus}M^{\oplus}$ to the styryl group is considered to be non-limiting except by reason of ease of preparation. Thus, for example, in the case of polyvinyl toluene sulfonate prepared by polymerization of a mixed ortho and para vinyl toluene monomer, as is generally commercially supplied, the sulfonate would enter respective positions along the chain in accordance with the generally well established rules of organic chemistry; each position being determined by the relative positions already occupied on the aromatic nucleus by the polymer backbone and the methyl group. In the case of polystyrene, the sulfonate would enter ortho and para to the position linked to the polymer backbone.

In preparing the basic polymer for subsequent sulfonation, a wide range of molecular weights can be produced by variation of such factors as catalyst, temperature and type of polymerization; that is, whether polymerization is performed by solution, bulk or emulsion techniques.

In general, it is preferable to use emulsion methods since these methods produce higher molecular weights at more rapid rates. Many emulsion polymers may be prepared using the following formulations:

(A) 100 cc. $H_2O$:
   52 g. monomer (vinyl toluene)
   3.0 cc. sulfated aryl ether soap
   0.25 g. azobisisobutyronitrile catalyst (B) Same as above but using:
   0.25 g. potassium persulfate catalyst and
   0.10 g. sodium bisulfite activator in place of the azobisisobutyronitrile catalyst
(C) Same as (A) but using:
   0.150 g. cumene hydroperoxide catalyst and
   0.075 g. sodium bisulfite activator in place of the azobisisobutyronitrile catalyst The above may be repeated using styrene as the monomer.

The formulations may be either
(1) Canned under nitrogen atmosphere and run at 46° C. (or other temperature above room temperature) in a constant temperature apparatus with agitation (i.e. a laundrometer).
(2) Placed under nitrogen atmosphere in a bottle and shaken at room temperature.

After the monomer is polymerized, the slurry is diluted with 400 cc. of $H_2O$ and the polymer is coagulated by adding 15 grams of NaCl. The product is filtered and washed until no positive test for chloride could be obtained with the wash liquor. The product is dried in a vacuum oven at 65° C. and 200 mm. of mercury pressure for 12–15 hours.

It has been found that base polymers having a 2.1% dichloroethane viscosity higher than 20 cp. produced the best thickeners upon subsequent sulfonation. The very high viscosity products yielded sulfonates which are effective at 0.10%–0.15% in salt water.

The product polymers may be sulfonated using any recommended procedure for sulfonation, but those procedures which are easily reproducible and can be controlled closely with regard to crosslinking are most useful for our purpose. The polymer was sulfonated in dichloroethane as solvent. As the polymer sulfonated, the sulfonic acid polymer structure precipitates from solution. This precipitate was filtered and immediately dissolved in methanol, and the salts prepared using this methanol solution.

The different salt preparations were performed as follows:

(1) Sodium salt—
   (a) Polystyrene sulfonate—to the methanol solution add 3 cc. of 1% phenophthalein and with stirring add dropwise a 50% solution of NaOH until the phenophthalein characteristic end point is reached. Centrifuge the product and decant the excess alcohol liquor. Transfer the gel-like solid to an evaporating dish and dry in a vacuum oven at 65° C. and 200 mm. of mercury pressure for 15–20 hours.
   (b) Polyvinyl toluene sulfonate—in this case follow a similar procedure except that after neutralization with the 50% NaOH, the liquor is taken down to about a 100 cc. volume on a steam bath and the resulting mass is hardened by adding 400–500 cc. of acetone. The product is ground under acetone, filtered and dried in a vacuum oven.
(2) Ammonium salt—place the methanol solution in a beaker and bubble in some gaseous ammonia for about 5 minutes or until the solution gets slightly cloudy. Place on a steam bath and evaporate down to about 100 cc. total volume. Add 500 cc. of acetone and allow the precipitate to harden. Filter and dry in a vacuum oven.
(3) n-Butyl amine salt—to the methanol solution add a molar excess of n-butyl amine. Heat lightly on a steam bath and then precipitate the salt by adding acetone. Filter and dry.
(4) Anilinium salt—prepare similarly to the n-butyl amine salt.
(5) Tri-n-butyl amine salt—add a molar excess of the amine to the sulfonic acid solution and heat on a steam bath to about 50 cc. volume. Harden by adding diethyl ether (250 cc.) and then grind under new ether.

It should be noted that acetone was not effective in precipitating this salt. The precipitated salt was filtered and air dried to remove excess ether and then was oven dried.

As pointed out heretofore, the polymer may be sulfonated by a number of procedures. However, a preferred procedure is as follows:

Dissolve the polymer in a suitable solvent (dichloroethane or other inert solvent) and add to a dichloroethane solution containing $SO_3$ which has been complexed with a phosphorus containing compound (triethyl phosphate). The resulting sulfonation is rapid and smooth and reproducibly yields a precipitated sulfonate which is substantially free from cross-links and has superior water solubility as compared to products prepared by other methods.

Other desirable water thickening agents to be used in conjunction with aldehyde solutions are secured by copolymerizing vinyl aromatics, such as styrene, vinyl toluene, vinyl naphthalene and the like with maleic anhydride. These materials are obtained in high molecular weights by using azobisisobutyronitrile as catalyst, and polymerizing at low temperatures, such as 30°–60° C. Other catalysts can be used, such as benzoyl peroxide and cumene hydroperoxide.

Specific vinyl aromatics exemplifying monomers that may be copolymerized with maleic anhydride are as follows: styrene, vinyl toluene, α-methyl styrene, p-chlorostyrene, dichlorostyrene, vinylnaphthalene, trans-stilbene, α,α-diphenylethylene, isoallylbenzene, vinylcarbazole and vinyl ferrocene.

The styrene may be copolymerized with maleic anhydride in methyl ethyl ketone at 60° C. using 0.036 gram of azobisisobutyronitrile as catalyst per mole of monomers. The copolymer is precipitated from methyl ethyl ketone solution with methanol, and then hydrolyzed by dissolving in dilute aqueous sodium hydroxide.

In general, synthetic polymers may be used in conjunction with formaldehyde. These polymers should contain an aromatic ring such as in a styrene polymer, a vinyl toluene polymer, a styrene-maleic ester polymer or should have a polyethylene oxide type of polymer, such as —$(CH_2CH_2O)_xCH_2CH_2OR$, where R=H, alkyl, cycloalkyl or aromatic ring. A polypropylene oxide type copolymer is also satisfactory as long as it is water soluble.

The molecular weights of the polymers of the present invention should be in excess of about 100,000. In general, preferred polymers should be above about 500,000, preferably, above 1,000,000. The molecular weights may be as high as 3,000,000 to 5,000,000 or up to 10,000,000 and higher. When a polymer has a molecular weight in the range from 500,000 to 1,000,000, it should be used in the concentration of less than about 1% by weight, preferably, in the range from 0.1 to 0.5% by weight. A desirable concentration is 0.3% by weight. The amount of polymer used generally is that amount which will give a viscosity in centipoises of from about 10 to 50 at 25° C.

In accordance with the present invention, larger viscosity retentions are realized when viscous aqueous solutions, for water-flooding, are used in conjunction with aldehyde solutions.

A number of tests were conducted using aldehyde solutions as follows:

EXAMPLE 1

A polymer solution comprising 100 cc. of water * and 0.38% of a polystyrene sulfonate polymer was prepared. In one operation 1 cc. of 37.5% aqueous formalin was added, and in another operation, no formalin was added. The results of these operations are as follows:

*Viscosity [1]/pH*

| Time of reflux, hours | Control (no additive) | 37.5% aqueous HCHO added (1 cc./100 cc. polymer) |
|---|---|---|
| 0 | 11.4/8.0 | 11.4/8.0 |
| 3 | 9.0/8.5 | 10.9/7.4 |
| 24 | 5.8/4.2 | |
| 48 | 3.5/4.1 | 8.7/3.0 |
| 72 | 3.0/3.9 | 8.4/3.1 |
| 96 | 2.3/4.0 | 8.0/3.8 |
| 168 | 1.8/4.0 | 6.9/3.8 |
| 192 | 1.8/4.0 | 6.7/3.9 |
| 216 | 1.7/4.0 | 6.5/3.9 |

[1] Viscosity—centipoises at 30 r.p.m. Temperature 140° F. on Brookfield viscosimeter. U.L. adaptor.

From the above, it is apparent that when the formalin was added, the viscosity retention was substantially greater than with no formalin present.

EXAMPLE 2

Additional tests were conducted using various additives for the purpose of increasing the viscosity stability of a polystyrene sulfonate polymer having a molecular weight of about 1,000,000. The concentration of the polystyrene sulfonate polymer in the aqueous solution was about 0.3%.

The results of these tests are as follows:

*Effect of Additives on Thermal Stability of Polystyrene Sulfonate*

[0.3% reservoir water solution]

| Additive | Amount, percent | Initial viscosity [1] | Percent viscosity retained after reflux | | | |
|---|---|---|---|---|---|---|
| | | | 24 hours | 48 hours | 96 hours | 240 hours |
| None | | 9.1 | [2] 42 | 33 | 14 | 7 |
| Methanol | 1.0 | 9.1 | [2] 121 | 97 | 54 | 10 |
| None | | 11.4 | 51 | | 20 | 15 |
| Formaldehyde | 1.0 | 11.4 | 50 | 76 | 70 | 54 |
| Diethylketone | 1.0 | 11.4 | 15 | 11 | | |
| Thiophenol | 1.0 | 11.4 | 30 | 11 | | |
| Formaldehyde [3] | 0.25 | 11.0 | 88 | 72 | [4] 60 | [5] 48 |
| Acetaldehyde | 1.0 | 11.0 | 8 | | | |
| Propionaldehyde | 1.0 | 11.0 | 10 | | | |

[1] Brookfield viscosity (cp., 60° C., 30 r.p.m., U.L. adaptor).
[2] 27 hours.
[3] 37% aqueous solution.
[4] Interpolated.
[5] 144 hours.

From the above, it is apparent that methanol causes an initial increase in viscosity. However, at extended reflux time, no beneficial effect is noted. Chain transfer agents such as diethylketone and thiophenol do not increase thermal stability. Of the three aldehydes investigated, formaldehyde is unique in that it increases thermal stability.

EXAMPLE 3

Additional tests were conducted wherein formaldehyde was used in conjunction with a styrene-maleic ester polymer having a molecular weight of about 1,300,000.

The data in the following table now show that as little as 0.037% formaldehyde substantially improves the reflux aging characteristics of an 0.5% solution of a styrene-maleic acid half ester polymer.

*Effect of Formaldehyde on Styrene-Maleic Ester Polymers*

| Additive | Hours refluxed (data reported as viscosity/pH) | | | | | |
|---|---|---|---|---|---|---|
| | 0 | 24 | 144 | 384 | 504 | 672 |
| None | 8.8/8.5 | 11.4/8.3 | 11.8/7.1 | 6.1/7.3 | 4.8/7.0 | 4.0/7.3 |
| 0.037% formaldehyde | 8.9/8.6 | 14.4/7.7 | 16.6/7.2 | 13.6/7.3 | 12.5/7.0 | 11.1/7.0 |

* Representative low salinity oil reservoir water=40 liters of water contains 2.72 grams sodium bicarbonate, 4.28 grams sodium sulfate, 5.52 grams magnesium chloride, 3.56 grams calcium chloride, 36.5 grams sodium chloride and 2.05 grams aluminum sodium sulfate—$(Al_2(SO_4)_3Na_2SO_4.24H_2O)$.

EXAMPLE 4

Additional tests were conducted using a polymer mixture comprising polyethylene oxide type polymers.

It was found that formaldehyde can be used to stabilize mixtures of different polymers even if one of the polymers degrades badly. Polyethylene oxide type polymers degrade badly on thermal aging. When such polymers are added to solutions of polyvinyl toluene sulfonate, the resultant mixtures are rapidly degraded. By adding formaldehyde, the mixture is dramatically improved toward thermal degradation. The following table illustrates this action with a solution containing 0.1% polyethylene oxide polymer (molecular weight about 1,000,000) and 0.2% polyvinyl toluene sulfonate (molecular weight about 1,000,000).

*Effect of Formaldehyde on Polymer Mixtures*

| Percent additive | Hours aged at 60° C. (reported as viscosity/pH) | | |
|---|---|---|---|
| | 0 | 30 | 120 |
| None, control | 41.4/8.7 | 9.8/7.7 | 8.4/7.2 |
| 0.18% formaldehyde | 40.0/8.7 | 31.6/7.4 | 28.6/6.9 |

EXAMPLE 5

Additional tests were carried out in a flow test. In this operation, a 5-foot column was packed with reservoir[1] sand and the unit maintained at 140° F. An aqueous solution of 0.3% of a sulfonated copolymer of styrene-vinyl toluene (50–50) was flowed through at a rate of 6" per day. The water comprised reservoir water. The solution contained 320 p.p.m. $Ca^{++}$ and 0.5% formalin and had an initial viscosity of 6.6 cs. at 25° C. Unit had pore volume=174.9 cc.; hydrocarbon pore volume=151.0 cc.; porosity=40.2%; and permeability of 13.9 darcies.

The results of these tests are as follows:

TABLE A — Oil recovery-pressure buildup

| Volume injected pore volume | Oil recovered, percent in place | Inlet pressure p.s.i.g. |
|---|---|---|
| 0.13 | 15 | 1.1 |
| 0.24 | 28 | 1.4 |
| 0.43 | 50 | 1.4 |
| 0.48 | 56 | 1.8 |
| 0.57 | 65 | 1.9 |
| 0.61 | 68 | 1.9 |
| 0.66 | 73 | 1.5 |
| 0.71 | 76 | 2.0 |
| 0.76 | 77 | 2.2 |
| 0.81 | 78 | 1.9 |
| 0.86 | 79 | 2.0 |
| 0.93 | 80 | 3.2 |
| 0.96 | 80 | 2.5 |
| 0.99 | 80 | 2.3 |
| 1.04 | 80 | 2.4 |

TABLE B — Viscosity recovery

| Pore volumes produced water[1] | Percent retained viscosity |
|---|---|
| 0.03 | 0 |
| 0.10 | 46 |
| 0.16 | 81 |
| 0.26 | 107 |
| 0.30 | 124 |
| 0.80 | 94.5 |

[1] Includes 0.14 pore volume connate water.

From Table A, it is apparent that excellent oil recovery was secured, namely, about 80% when injecting 1.04 pore volumes of the polymer solution. It is also apparent that no plugging occurred since increase in inlet pressure was insignificant.

After oil recovery, the viscosity of the produced water is determined as shown in Table B. It is evident that upon the production of 0.80 pore volumes of water, the viscosity retention was 94.5%, indicating viscosity stability.

Produced water was analyzed to determine the formaldehyde concentrations with the following results:

*Formalin Concentration of Effluent Samples From Flow Test*

| Pore volume produced solution (median) | Formalin concentration, percent of original |
|---|---|
| Original solution, no sand contact | 100 |
| 0.10 | 12.8 |
| 0.33 | 61.5 |
| 0.45 | 76.5 |
| 0.71 | 85.0 |
| 0.81 | 59.5 |
| | 91.5 |
| | 93.5 |
| | 89.5 |
| 0.93 | 76.5 |
| | 91.5 |
| | 91.5 |
| 1.08 | 89.5 |
| 1.26 | 89.5 |
| 1.40 | 91.5 |

From the above, it is apparent that very little formaldehyde was absorbed by the sand.

The concentration of the formaldehyde employed may vary appreciably, depending upon the particular type of thickening polymer used and the environment in which the polymer is utilized. In general, the minimum concentration of the formaldehyde is not below about .005% and should not exceed 4 to 5%. It is preferred that the concentration be below 1%, preferably, in the range from about 0.02 to 0.5% by weight.

What is claimed is:

1. An improved secondary recovery operation for the production of oil from a subterranean reservoir penetrated by an injection well and a production well, which comprises introducing into said reservoir through said injection well a displacing medium comprising water, a water soluble synthetic polymer having a molecular weight in excess of about 500,000, and from about 0.005 to 4.0 weight percent of formaldehyde based on the amount of said polymer present, said polymer being selected from the class consisting of polyvinyl aromatic sulfonates, copolymers of a vinyl aromatic and maleic anhydride, and alkylene oxide polymers, passing said displacing medium toward said production well and recovering oil from said production well.

2. An improved secondary recovery operation for the production of oil from a subterranean reservoir penetrated by an injection well and a production well which comprises introducing into said reservoir through said injection well a displacing medium comprising water, a water soluble synthetic polymer having a molecular weight in excess of about 500,000, and from about 0.02 to 0.5 weight percent of formaldehyde based on the amount of said polymer present, said polymer being selected from the class consisting of polyvinyl aromatic sulfonates, copolymers of a vinyl aromatic and maleic anhydride, and alkylene oxide polymers, passing said displacing medium toward said production well and recovering oil from said production well.

3. A process as defined by claim 2 wherein said polymer is a copolymer of a vinyl aromatic and maleic anhydride.

4. A process as defined by claim 2 wherein said polymer is a polyvinyl toluene sulfonate.

5. A process as defined by claim 2 wherein said polymer is a polystyrene sulfonate.

6. A process as defined by claim 2 wherein said polymer is an alkylene oxide polymer.

(References on following page)

---

[1] A sand from the oil fields containing 2–3% clays of different ion exchange values.

References Cited in the file of this patent

UNITED STATES PATENTS

| | | | |
|---|---|---|---|
| 2,341,500 | Detling | Feb. 8, | 1944 |
| 2,612,485 | Baer et al. | Sept. 30, | 1952 |
| 2,718,497 | Oldham et al. | Sept. 20, | 1955 |
| 2,801,216 | Yoder | July 30, | 1957 |
| 2,827,964 | Sandiford et al. | Mar. 25, | 1958 |
| 2,839,467 | Hutchison et al. | June 17, | 1958 |
| 2,842,492 | Von Engelhardt et al. | July 8, | 1958 |
| 2,987,475 | Legator | June 6, | 1961 |